Nov. 22, 1932.  H. C. TOEPPER  1,888,641
ARTIFICIAL FISH BAIT
Filed Nov. 26, 1930
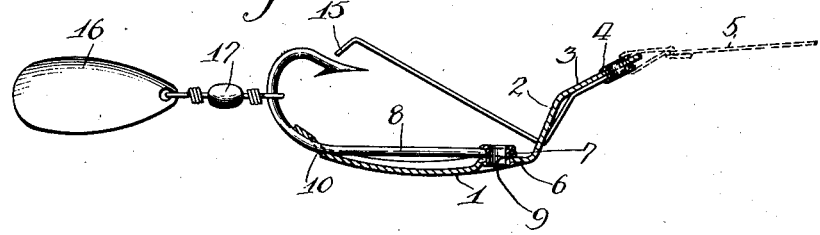
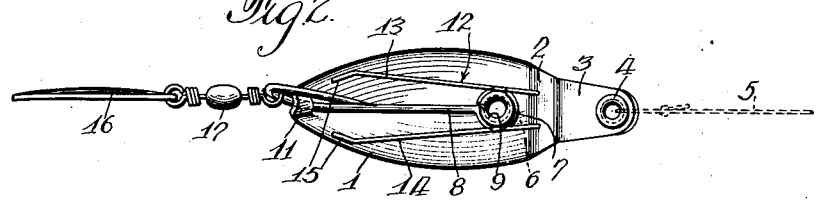
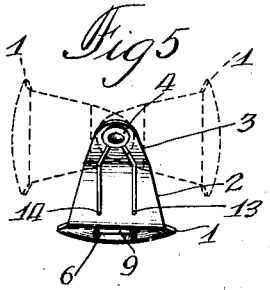
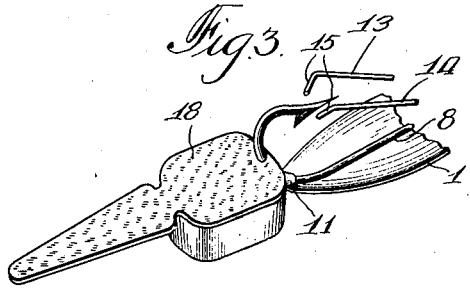
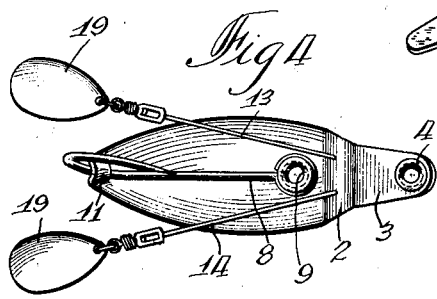
Inventor:
Henry C. Toepper
By Jones, Addington, Ames & Seibold
Attys.

Patented Nov. 22, 1932

1,888,641

UNITED STATES PATENT OFFICE

HENRY CHARLES TOEPPER, OF DES PLAINES, ILLINOIS

ARTIFICIAL FISH BAIT

Application filed November 26, 1930. Serial No. 498,905.

My invention relates to artificial fish bait and, more particularly, to weedless artificial fish bait of a heavier than water spoon type.

A desirable feature of the present invention is the provision of an attractive spoon type bait arranged to give a lifelike appearance when drawn through the water, and which appearance is attained in the present instance by means of oscillatory movement relative to a longitudinal axis substantially parallel with the line to which the lure or bait is attached.

The present invention also provides a weedless type bait which is of few parts, cheap to manufacture, easy to assemble, and which will not easily get out of order.

In the present invention, the center of gravity is so positioned relative to an inclined plane that the pressure of water against the inclined plane will tend to rotate the spoon. However, the construction and relation of parts is such that when the spoon has been moved substantially 90° in one direction, the gravity will overcome the action due to the pressure of water on the inclined plane and the lure will take a slightly angular position relative to the longitudinal axis, and the pressure of the water against the angularly disposed inclined plane will then tend to move the spoon in the opposite direction. This movement is repeated as the bait continues to oscillate through substantially 180° as it is drawn through the water.

My invention also contemplates a lure which may be effectively used either for trolling or casting and wherein a suitable pork rind bait may be used to provide the necessary drag to assist in controlling the action of the lure in its passage through the water.

Further objects will be apparent from the specification and the appended claims.

In the drawing:

Figure 1 is a longitudinal sectional elevation through an artificial bait constructed in accordance with my invention.

Fig. 2 is a top view of the device as illustrated in Fig. 1;

Fig. 3 is a fragmentary perspective view illustrating the method of using a common form of pork rind bait and the method of attaching it to provide the necessary balance for the spoon, whereby an oscillating movement may be attained.

Fig. 4 is a modified form whereby the balance is maintained by means of small spinners secured to the weedless means; and Fig. 5 is a front view illustrating the oscillatory movement of the spoon.

Referring to the drawing in detail, the embodiment illustrated comprises a sheet metal spoon 1 having formed integrally therewith an upwardly extending inclined plane portion 2 and a forwardly extending inclined portion 3, the latter having an eyelet 4 at its forward end to which a suitable line 5 may be secured. The spoon is preferably of a comparatively shallow type, as illustrated, and is formed adjacent its front end to provide a flat portion 6 on which the loop or ring portion 7 of an ordinary fishhook 8 rests and which is secured to the flat portion 6 by means of an eyelet 9. This flattened surface serves to hold the fishhook rigidly in an upright position. The shank of the hook extends through a slot 10 at the rear end of the spoon, the portion beyond the slot being formed at 11 to provide a groove through which the shank of the hook 8 extends.

In order to prevent the hook from catching on the weeds, a suitable weed guard 12 is provided which comprises a U-shaped resilient wire member secured to the underside of the forwardly extending inclined portion 3 by means of the eyelet 4. Arms 13 and 14 of the U-shaped weed guard extend rearwardly through small closely fitting holes in the inclined portion 2, thereby being held securely in position. The rearwardly extending arms 13 and 14 extend to a position slightly above and at each side of the point of the hook, and the ends are turned downwardly at 15. The weed guards effectively prevent the hook from catching on any object when it is drawn thereover, and the resiliency of the guards allow the effective operation of the lure for fishing purposes.

In order to provide a proper balance for the lure and to maintain a center of gravity effective to provide a desired oscillatory movement and also to provide a more attractive bait, a spinner 16 is loosely mounted on the hook 8 by means of the usual swivel connection 17. This swivel connection is of the ordinary type used in fishing tackle, and it is believed that no further description thereof is necessary.

As the bait is drawn through the water, the pressure of the water against the inclined plane portion 2 will cause the spoon to move to one of the dotted line positions shown in Fig. 5. At this point the center of gravity and the drag of the spinner 16 will cause the spoon to take a slightly angular position longitudinally and the resulting angular position of the inclined portion 2 will cause the action of the water thereagainst to reverse the oscillatory movement and the spoon will then move through approximately 180° to the opposite dotted line position where the action will be repeated in the opposite direction. This oscillatory movement will be continued as long as the lure is drawn through the water.

It has been found that in order to obtain the desired movement of the spoon, the center of gravity, upwardly inclined portion 2, forwardly inclined portion 3 and the retarding member 16 preferably bear a relation substantially as illustrated in the drawing.

In Fig. 3 a type of pork rind bait 18 is shown, which may be substituted for the spinner 16 and which has been found to provide the necessary drag by which the effective oscillatory movement may be controlled.

In Fig. 4 is shown a further modification in which suitable spinners 19 are connected to the ends of the weed guard members 13 and 14 by means of swivel connections 20, and which provide a suitable drag means whereby the spoon is prevented from complete rotation.

It is obvious that changes may be made in the embodiment specifically shown and described without departing from the spirit of the invention, and I desire to be limited only by the prior art and the appended claims.

Having thus described my invention, what I claim and desire to secure by Letters Patent is:

1. A lure of the character described comprising an elongated sheet metal member formed to provide a shallow spoon portion, a fishhook secured adjacent the front end of said spoon and engaging the opposite end, the front end of said member being tapered and bent upwardly on a transverse line adjacent the front end of said hook to form an upwardly and forwardly extending tapered transverse plane, the extreme forward end of said member being formed to provide a line engaging portion at an angle to the horizontal less than the said plane, a line engaging eyelet in said forward end, and weed guards secured by said eyelet and extending to a position adjacent the point of said hook.

2. A fish lure including a spoon portion having a shoulder adjacent its forward end and a forwardly extending portion on said shoulder, an upwardly extending hook on said lure, and weed guards secured to said forwardly extending portion and extending through said shoulder in spaced relation and cooperating therewith to position one of said weed guards on each side of the vertical plane of said hook.

3. A fish lure including a spoon portion having an upwardly extending portion adjacent its forward end, an upwardly extending hook on said spoon portion, weed guards secured in front of said upwardly extending portion and extending in spaced relation to a point adjacent the point of said hook and retained in alignment by engagement with said upwardly extending portion.

In witness whereof, I have hereunto subscribed my name.

HENRY CHARLES TOEPPER.